Aug. 15, 1939.　　　A. B. POOLE　　　2,169,901
COMBINED ELECTRIC MOTOR AND SPEED-REDUCTION-TRAIN UNIT
Filed June 27, 1938　　　3 Sheets-Sheet 1

Inventor
Arthur B. Poole
By Seymour Earle Nichols
Attorneys

Aug. 15, 1939.  A. B. POOLE  2,169,901
COMBINED ELECTRIC MOTOR AND SPEED-REDUCTION-TRAIN UNIT
Filed June 27, 1938  3 Sheets-Sheet 2
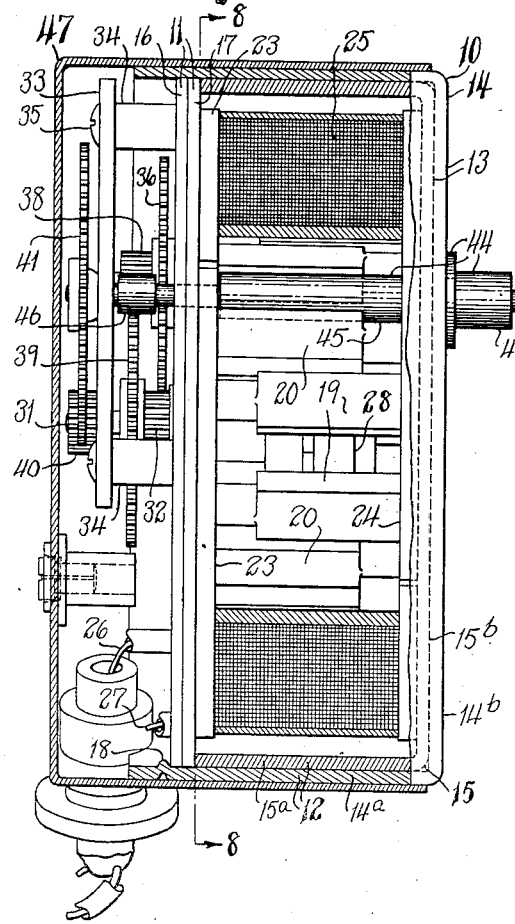
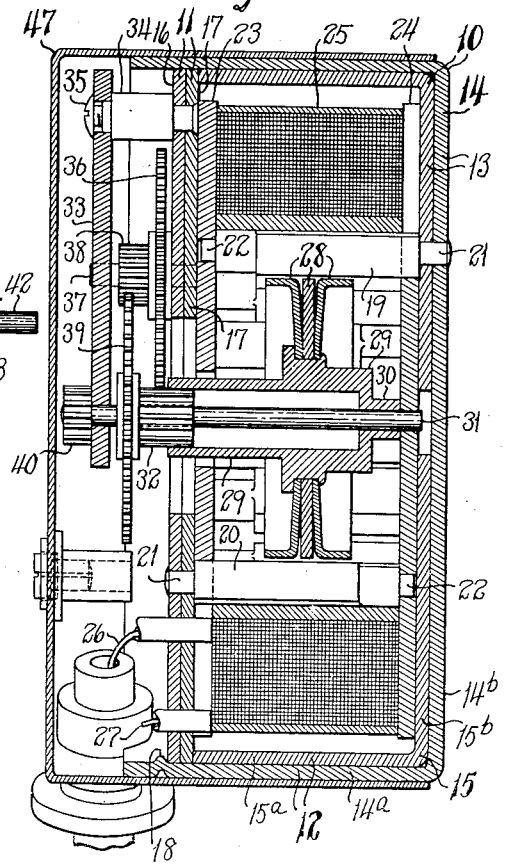
Inventor
Arthur B. Poole
by Seymour, Earle & Nichols
Attorneys Aug. 15, 1939.    A. B. POOLE    2,169,901
COMBINED ELECTRIC MOTOR AND SPEED-REDUCTION-TRAIN UNIT
Filed June 27, 1938    3 Sheets-Sheet 3

Inventor
Arthur B. Poole
by Seymour Earle Nichols
Attorneys

Patented Aug. 15, 1939

2,169,901

UNITED STATES PATENT OFFICE 2,169,901

COMBINED ELECTRIC MOTOR AND SPEED-REDUCTION-TRAIN UNIT

Arthur B. Poole, Bristol, Conn., assignor to The E. Ingraham Company, Bristol, Conn., a corporation of Connecticut Application June 27, 1938, Serial No. 216,176

8 Claims. (Cl. 172—36)

This invention relates to an improvement in electric-motor structures, and more particularly to motor-structures with which are combined speed-reduction trains.

The present invention is primarily concerned with electric-motors and speed-reduction trains for use in connection with the propulsion of clocks and other time-instruments, though not so limited in its application.

One of the objects of the present invention is to provide a superior combined electric-motor and speed-reduction-train unit wherein a maximum degree of compactness is effected.

Another object of the present invention is to provide a superior combination structure of the character referred to wherein the rotating parts are assured of ample lubrication.

A further object is to provide a combined electric-motor and speed-reduction-train carrying a reservoir of oil or other lubricant and so constructed and arranged that the tilting of the combined structure will not occasion appreciable leakage of such lubricant.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 5 is a view of the combined electric-motor and speed-reduction-train structure, partly in side elevation and partly in transverse section taken on the line 5—5 of Fig. 1;

Fig. 6 is a sectional view taken on the line 6—6 of Fig. 1 and of a similar character to Fig. 5 save that the parts are shown more completely in section;

Fig. 7 is a fragmentary sectional view taken on the line 7—7 of Fig. 1;

Figure 1:
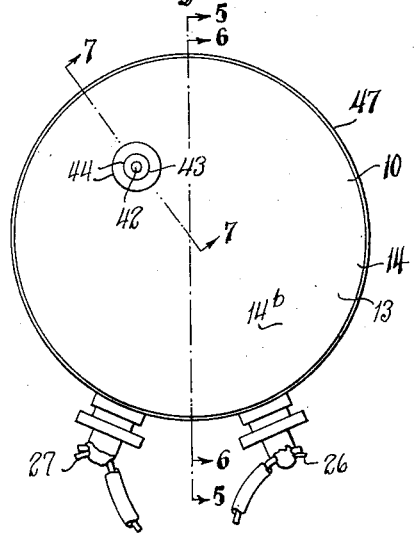
Fig. 1 is a view in front elevation of a combined electric-motor and speed-reduction-train unit constructed in accordance with the present invention.
Figure 2:
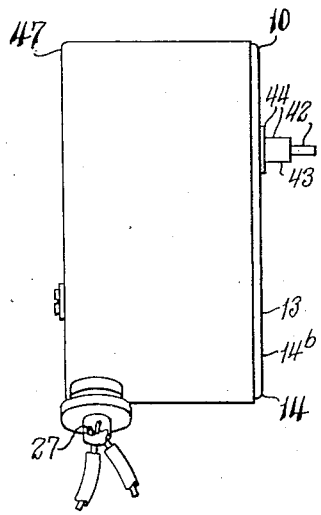
Fig. 2 is a view thereof in side elevation.

The particular electric-motor and speed-reduction-train unit herein chosen for the purpose of illustrating the present invention, includes a synchronous electric-motor structure adapted to propel clocks or other time-instruments in accurate synchronism with properly-controlled alternating or other sinuous current of commercial frequency and voltage, such for instance as 60-cycle alternating current having a potential of 110 volts.

Certain structural features herein shown and described are more fully described and particularly claimed in my copending applications Ser. Nos. 177,839, 204,932, 204,933, 204,934, 207,670, and 216,176; and respectively filed December 3, 1937, April 25, 1938, May 13, 1938, and June 24, 1938.

The structure referred to includes a cup-shaped pole-unit, generally designated by the reference character 10, and a complemental disk-like pole-unit, generally designated by the reference character 11, both of which are composed of suitable magnetic material, such for instance as soft iron, silicon steel, or the like. The cup-shaped pole-unit 10 comprises a relatively-deep annular flange, generally designated by the reference character 12, and a substantially flat end-wall, generally designated by the reference character 13. The said cup-shaped pole-unit 10 is of laminated character in that it is composed of a relatively deep outer cup-shaped member, generally designated by the reference character 14, and a relatively shallow inner cup-shaped member, generally designated by the reference character 15, and tightly fitted within the said outer cup-shaped member.

The outer cup-shaped member 14 of the cup-shaped pole-unit 10 includes a relatively-deep flange or skirt 14a and an end-wall 14b. The complemental inner cup-shaped member 15 of the pole-unit 10 includes a flange or skirt 15a which is of lesser depth than the skirt or flange 14a of the member 14, and also includes an end-wall 15b closely positioned against the adjacent face of the end-wall 14b of the member 14, before referred to.

The disk-like pole-unit 11 comprises an outer disk 16 and an inner disk 17, both of which fit within the open end of the flange 12 of the cup-shaped pole-unit 10, so that the said inner disk 17 abuts against the edge of the flange or skirt 15a of the inner cup-shaped member 15 of the said pole-unit.

The flange or skirt 14a of the outer cup-shaped member 14 of the cup-shaped pole-unit 10 is upset to provide a plurality of nibs or indents 18 extending over the adjacent edge of the outer disk 16 of the disk-like pole-unit 11 to firmly retain the latter in organized relationship with respect to the otherwise open end of the cup-shaped pole-unit 10. The end-wall 13 of the cup-shaped pole-unit 10 has rearwardly projecting from it in coaxial relationship an annular series of bar-like salient poles 19 formed of suitable magnetic material. In the particular instance illustrated the said salient poles 19 are arranged in three (more or less) pairs, the individual poles of each pair being more closely adjacent each other than are the various pairs to each other.

In a manner similar to that described in connection with the cup-shaped pole-unit 10, the disk-like pole-unit 11 is provided with an annular series of bar-like salient poles 20 also arranged in three (more or less) pairs in substantially the same manner as are the salient poles 19 of the cup-shaped pole-unit 10, above described.

The pairs of salient poles 19 of the cup-shaped pole-unit 10 are positioned in the relatively wide gaps existing between the respective pairs of salient poles 20 of the disk-like pole-unit 11, and conversely, the pairs of salient poles 20 of the said disk-like pole-unit 11 extend forwardly into the relatively wide gap existing between the respective pairs of salient poles 19 of the cup-shaped pole-unit 10.

The end-wall 13 of the cup-shaped pole-unit 10 and the disk-like pole-unit 11 may, for convenience of description, be regarded as spaced-apart magnetic portions which extend in substantial parallelism, and each of which is provided with an annular series of salient poles, such, for instance, as the salient poles 19 and 20 respectively.

For the purpose of economy of manufacture, the salient poles 19 and the salient poles 20 correspond to each other in size and form, so as to be interchangeable to facilitate manufacture and assembly, and each of the said salient poles, throughout the major portion of its length, is of substantially rectangular form in cross-section, though having a slightly-concave inner face and a slightly-convex outer face, both of which faces extend in substantial concentricity with respect to the structure as a whole.

Each of the salient poles 19 and 20 is formed at one end with a cylindrical shank 21, by means of which it may be riveted or otherwise secured to its particular one of the pole-units 10 or 11. Each of the said salient poles 19 and 20 is also formed at its end opposite the shank 21 with a stabilizing-tenon 22. The stabilizing-tenons of the salient poles 19 extend into suitable perforations in a plate-like shading-disk 23 located against the inner face of the disk-like pole-unit 11. Similarly, the stabilizing-tenons 22 of the salient poles 20 of the disk-like pole-unit 11 extend into suitable perforations in a complemental shading-disk 24 located against the inner face of the end-wall 13 of the cup-shaped pole-unit 10.

The shading-disks 23 and 24, above referred to, form no essential feature of the present invention, and as has been more fully explained in my co-pending application Serial No. 177,839, filed December 3, 1937, the said shading-disks act upon the various salient poles to provide a rotating-field effect in a manner well understood in the art.

Surrounding the salient poles 19 and 20 which latter, as before explained, are arranged in annular series, is a ring-like energizing-coil 25 provided with two leads 26 and 27 which are adapted to be connected to a source of electrical energy, in a manner which is not per se involved in the present invention.

Enclosed within the complemental annular series of salient poles 19 and 20, before described, is a rotor-unit, generally designated by the reference character 28, and which may be of any approved type herein requiring no detailed description other than to say that it has a hollow hub 29 formed at its forward end with a reduced bearing-portion 30 rotatably engaging the periphery of the forward end of a center-shaft 31. The rear of the hub 19 has forced into it with a drive-fit a drive-pinion 32 which also revolves upon the center-shaft 31 adjacent the rear end thereof, as is clearly illustrated in Fig. 6.

The forward end of the center-shaft 31, above referred to, bears for rotation in the shading-disk 24 of the cup-shaped rotor-unit 10 and bears adjacent its rear end in a substantially triangular bearing-plate 33 formed of brass or other suitable bearing material and located in spaced relationship rearwardly of the disk-like pole-unit 11. The said bearing-plate 33 is held in the spaced relationship above referred to by means of a plurality of pillars 34 riveted or otherwise secured to the disk-like pole-unit 11, and having the said bearing-plate secured to their respective outer ends by means of screws 35 which respectively enter the said pillars 34.

The drive-pinion 32 at the rear end of the hub 29 of the rotor-unit 28 meshes into and drives a gear-wheel 36 which is journaled for rotation upon a short shaft 37 which latter is mounted at its rear end in the bearing-plate 33 and at its forward end in the disk-like pole-unit 11. The said gear-wheel 36 has rigidly attached to it a pinion 38 which in turn meshes into and drives a gear-wheel 39 which is staked or otherwise rigidly secured to the center-shaft 31, before referred to.

Figure 3:
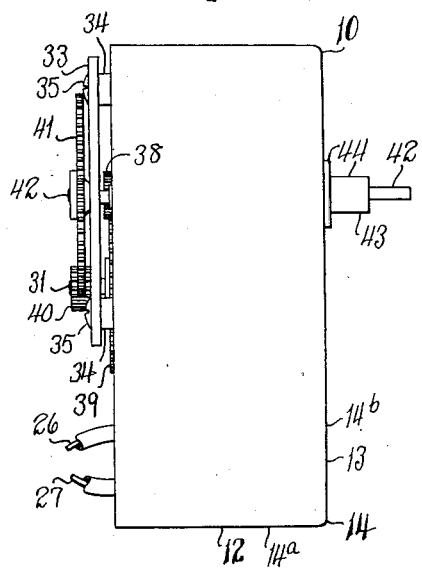
Fig. 3 is a view in side elevation of the combined electric-motor and speed-reduction-train structure with the housing-member omitted.
Figure 4:
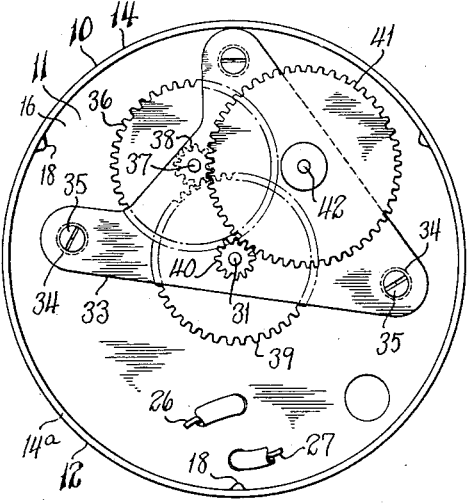
Fig. 4 is a view of the structure in rear elevation and also omitting the housing-member.

The rear-end portion of the center-shaft 31 which projects beyond the rear face of the bearing-plate 3, has rigidly attached to it a pinion 40 which meshes into and drives a gear-wheel 41 (Figs. 3, 4 and 5). The gear-wheel 41, just referred to, is staked or otherwise secured to the rear end of a power-output shaft 42 immediately to the rear of the bearing-plate 33. The rear end of the said power-output shaft 42 is journaled for rotation in the bearing-plate 33 and its front portion is journaled in the head-portion 43 of a bushing-like guard-tube 44. The head-portion 43 of the said guard-tube 44 extends through and is rigidly mounted in the end-wall 13 of the cup-shaped pole-unit 10. The guard-tube 44 also includes a relatively slender rearwardly-extending tubular oil-guard 45 having its rear end located closely adjacent the front face of the shading-disk 23 of the disk-like pole-unit 11.

The interior of the tubular oil-guard 45 of the bearing-bushing 44 is clear of the periphery of the power-output shaft 42, so that the said shaft bears only in the head-portion 43 of the said bearing-bushing. As is particularly well shown in Figs. 5 and 7, the rear end of the power-output shaft 42 is provided with a staked-on collar 46 which is located intermediate the bearing-plate 33 and the disk-like pole-unit 11, so as to guard against the undue axial displacement of the said power-output shaft.

The various gear-wheels and pinions above described, together with their associated parts, constitute a speed-reduction-train which serves to reduce the speed of the power-output shaft 42 or its equivalent with respect to the speed of the rotor-unit 28.

In the particular structure shown, a cup-shaped housing-member, generally designated by the reference character 47, tightly fits over the flange 12 of the cup-shaped pole-unit 10 and is arranged in opposition to the said pole-unit, so as to provide in conjunction therewith a substantially oil-tight casing or housing for the speed-reduction train and the various elements of the motor-structure proper.

Figure 8:
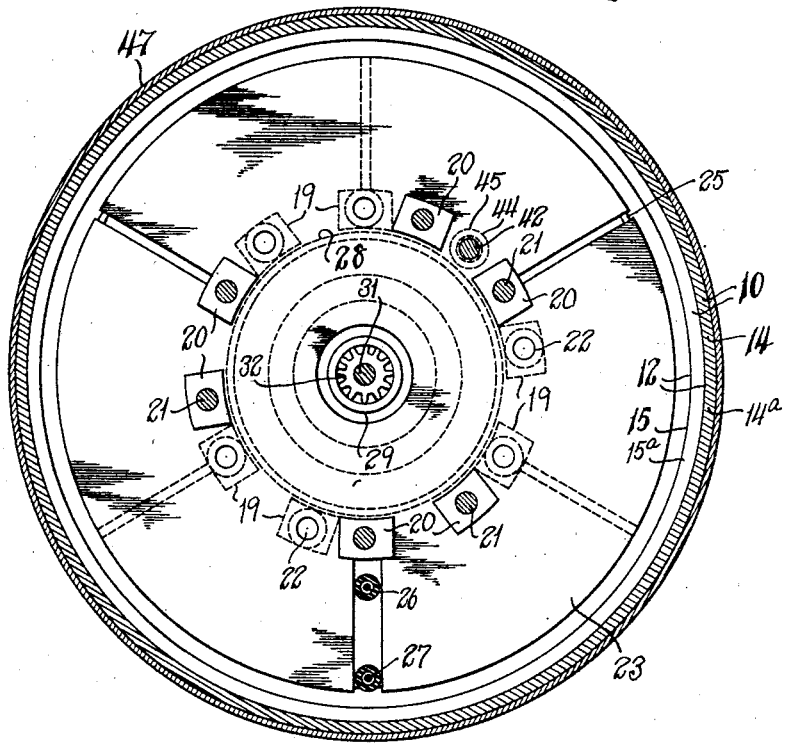
Fig. 8 is a sectional view taken on the line 8—8 of Fig. 5.
Figure 9:
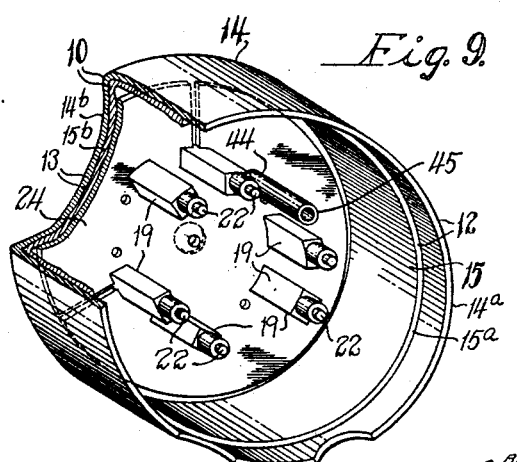
Fig. 9 is a perspective view, partly in section, of the cup-shaped pole-unit.

The power-output shaft 42 above described, together with the bearing-bushing 44, is accommodated radially between the inner periphery of the energizing-coil 25 and the outer periphery of the rotor-unit 28. In a direction circumferentially of the structure, the said power-output shaft 42 and its bearing-bushing 44 are accommodated between the two individual salient poles of a pair thereof, as will be especially well seen by reference to Figs. 5 and 8.

From the foregoing, it will be seen that a great economy of space is effected by the arrangement shown and described, and whereby the main or appreciable portions of the speed-reduction-train may be located at one end of the motor-structure and the power-output be extended to the other side or face of the motor-structure, without entailing the undue enlargement of the assembly, for its accommodation.

By extending the tubular oil-guard 45 of the bearing-bushing 44 in the manner shown and described, a relatively large body of oil may be accommodated within the casing or housing afforded by the cooperating cup-shaped pole-unit 10 and the housing-member 47 without occasioning the leakage of such oil outwardly past the forward end of the power-output shaft 42 in the event that the structure is tilted or laid down on its front face.

By arranging the center shaft 31 so that the same rotates independently of the rotor-unit 28 and provides a support therefor, further economy of space is effected and a readily assemblable structure is provided.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A combined electric motor and speed-reduction train including in combination: a field-structure having an annular series of salient poles; a rotor positioned within the interior of the said annular series of salient poles; an energizing-coil positioned around the exterior of the said annular series of salient poles; and a speed-reduction train operatively connected to the said rotor and including a rotary member located radially intermediate the inner periphery of the said ring-like energizing-coil and the outer periphery of the said rotor-unit and located circumferentially intermediate two of the salient poles of the said annular series thereof.

2. A combined electric motor and speed-reduction train including in combination: a field-structure having an annular series of salient poles; a rotor positioned within the interior of the said annular series of salient poles; an energizing-coil positioned around the exterior of the said annular series of salient poles; a gear-train located adjacent one end of the said rotor to which latter the said gear-train is operatively connected; and a rotary shaft operatively connected to the said gear-train for being driven thereby and extending to a position at the opposite end of the said rotor from the said gear-train through a space, the outer and inner boundaries of which space are respectively defined by the inner periphery of the said ring-like energizing-coil and the outer periphery of the said rotor-unit and the side boundaries of which space are defined by two of the salient poles of the said annular series thereof.

3. A combined electric motor and speed-reduction train including in combination: a field-structure having an annular series of salient poles; a rotor positioned within the interior of the said annular series of salient poles; an energizing-coil positioned around the exterior of the said annular series of salient poles; a tubular oil-guard located radially intermediate the inner periphery of the said ring-like energizing-coil and the outer periphery of the said rotor and located circumferentially intermediate of two of the salient poles of the said annular series thereof; and a speed-reduction train operatively connected to the said rotor and including a rotary member extending through the said tubular oil-guard.

4. A combined electric motor and speed-reduction train including in combination: a field-structure having an annular series of salient poles; a rotor positioned within the interior of the said annular series of salient poles; an energizing-coil positioned around the exterior of the said annular series of salient poles; a gear-train located adjacent one end of the said rotor to which latter the said gear-train is operatively connected; a tubular oil-guard extending from one side of the said rotor to the other side thereof through a space, the outer and inner boundaries of which space are respectively defined by the inner periphery of the said ring-like energizing-coil and the outer periphery of the said rotor unit and the side boundaries of which space are defined by two of the salient poles of the said annular series thereof; and a rotary shaft extending through the said tubular oil-guard and operatively connected to the said gear-train for being driven thereby.

5. A combined electric motor and speed-reduction train including in combination: a first magnetic portion; a second magnetic portion spaced from and extending in substantial parallelism with the first magnetic portion; a first annular series of salient poles projecting from the said first magnetic portion toward the said second magnetic portion; a second annular series of salient poles projecting from the said second magnetic portion toward the said first magnetic portion into the spaces between the salient poles of the said first annular series thereof; an energizing-coil extending around the exterior of both of the said annular series of salient poles and located intermediate the two said spaced-apart magnetic portions; a rotor positioned within the interior of both of the said annular series of salient poles; and a speed-reduction train operatively connected to the said rotor and including a rotary member located radially intermediate the inner periphery of the said ring-like energizing-coil and the outer periphery of the said rotor and located circumferentially intermediate two of the salient poles of the said annular series thereof.

6. A combined electric motor and speed-reduction train including in combination: a first magnetic portion; a second magnetic portion spaced from and extending in substantial parallelism with the first magnetic portion; a first annular series of salient poles projecting from the said first magnetic portion toward the said second magnetic portion; a second annular series of salient poles projecting from the said second magnetic portion toward the said first magnetic portion into the spaces between the salient poles of the said first annular series thereof; an energizing-coil extending around the exterior of both of the said interfitting annular series of salient poles and located intermediate the two said spaced-apart magnetic portions; a rotor positioned within the interior of both of the said annular series of salient poles; a gear-train operatively connected to the said rotor for being driven thereby and located adjacent the exterior of one of the said spaced-apart magnetic portions; and a rotary shaft operatively connected to the said gear-train and extending across the space between the said first magnetic portion and the said second magnetic portion and through both of the same, the said rotary shaft being located radially intermediate the inner periphery of the said ring-like energizing-coil and the outer periphery of the said rotor and located circumferentially intermediate two of the salient poles of the said annular series thereof.

7. A combined electric motor and speed-reduction train including in combination: a first magnetic portion; a second magnetic portion spaced from and extending in substantial parallelism with the first magnetic portion; a first annular series of salient poles projecting from the said first magnetic portion toward the said second magnetic portion; a second annular series of salient poles projecting from the said second magnetic portion toward the said first magnetic portion into the spaces between the salient poles of the said first annular series thereof; an energizing-coil extending around the exterior of both of the said annular series of salient poles and located intermediate the two said spaced-apart magnetic portions; a rotor positioned within the interior of both of the said annular series of salient poles; a tubular oil-guard carried by one of the aforesaid magnetic portions and projecting toward the other of the said magnetic portions in a position radially intermediate the inner periphery of the said ring-like energizing-coil and the outer periphery of the said rotor and located circumferentially intermediate two of the salient poles of the said annular series thereof; a gear-train located adjacent the outer face of one of the said magnetic portions and operatively connected to the said rotor for being driven thereby; and a power-output shaft operatively connected to the said gear-train and extending through both of the said magnetic portions and through the said tubular oil-guard.

8. A combined electric motor and speed-reduction train including in combination: a first magnetic portion; a second magnetic portion spaced from and extending in substantial parallelism with the first magnetic portion; a first annular series of salient poles projecting from the said first magnetic portion toward the said second magnetic portion; a second annular series of salient poles projecting from the said second magnetic portion toward the said first magnetic portion into the spaces between the salient poles of the said first annular series thereof; an energizing-coil extending around the exterior of both of the said annular series of salient poles and located intermediate the two said spaced-apart magnetic portions; a rotor positioned intermediate the two said magnetic portions and within the interior of both of the said annular series of salient poles; a tubular oil-guard extending from one side to the other of the said rotor through a space the outer and inner boundaries of which are respectively defined by the inner periphery of the said ring-like energizing-coil and the outer periphery of the said rotor unit and the side boundaries of which space are defined by two of the salient poles of the said annular series thereof; a gear-train operatively connected to the said rotor for being driven thereby; and a power-output shaft extending from the said gear-train to which it is operatively connected through the said tubular oil-guard to a position exterior of the structure for attachment to a device to be driven.

ARTHUR B. POOLE.